(12) United States Patent
Tran (10) Patent No.: US 7,124,800 B2
(45) Date of Patent: Oct. 24, 2006

(54) TIRE REMOVAL TOOL

(76) Inventor: Loi Van Tran, 1028 Jackson St., Easton, PA (US) 18042

( * ) Notice: Subject to any disclaimer, the term of this patent is extended or adjusted under 35 U.S.C. 154(b) by 48 days.

(21) Appl. No.: 11/021,034

(22) Filed: Dec. 23, 2004

(65) Prior Publication Data
US 2006/0137829 A1 Jun. 29, 2006

(51) Int. Cl.
B60C 25/01 (2006.01)
(52) U.S. Cl. ................................ 157/1.17
(58) Field of Classification Search .......... 157/1.17, 157/1.3, 1.49
See application file for complete search history.

(56) References Cited

U.S. PATENT DOCUMENTS

| | | | |
|---|---|---|---|
| 834,908 A | 11/1906 | Hussey | |
| 934,461 A | 9/1909 | Phillips | |
| 1,271,919 A | 7/1918 | Mathias | |
| 1,452,596 A * | 4/1923 | De Fernelmont | 157/1.17 |
| 1,506,654 A * | 8/1924 | Michelin | 157/1.17 |
| 1,507,208 A * | 9/1924 | Schlenker | 157/1.17 |
| 1,806,947 A * | 5/1931 | Mjelva | 157/1.17 |
| 2,188,211 A | 1/1940 | Tilson | |
| 2,293,467 A * | 8/1942 | Kenworthy | 157/1.17 |
| 2,294,271 A | 8/1942 | Bethard | |
| 2,314,127 A * | 3/1943 | Colley et al. | 157/1.17 |
| 2,399,146 A | 4/1946 | Schumann | |
| 2,509,945 A * | 5/1950 | Strech et al. | 157/1.17 |
| 2,518,114 A * | 8/1950 | Barber | 157/1.17 |
| 2,565,216 A | 8/1951 | Gox | |
| 2,703,605 A * | 3/1955 | Manupello | 157/1.17 |
| 2,712,350 A | 7/1955 | Henderson | |
| 2,771,941 A * | 11/1956 | Manupello | 157/1.17 |
| 3,253,640 A * | 5/1966 | Paulauskas | 157/1.17 |
| 3,873,067 A | 3/1975 | Carpio et al. | |
| 4,090,548 A | 5/1978 | Wolf | |
| 4,133,363 A | 1/1979 | Gardner | |
| 4,360,052 A | 11/1982 | Norris | |
| 4,403,640 A | 9/1983 | Schifferly | |
| 4,436,134 A | 3/1984 | Gaither | |
| 4,461,335 A | 7/1984 | Beemer | |
| 4,527,607 A | 7/1985 | Gaither | |
| 4,738,294 A | 4/1988 | Fosse | 157/1.22 |
| 4,756,354 A | 7/1988 | Callas | 157/1.3 |
| 4,846,239 A | 7/1989 | Heller et al. | 157/1.3 |

(Continued)

Primary Examiner—David B. Thomas
(74) Attorney, Agent, or Firm—Duane Morris LLP (57) ABSTRACT

A tool is provided for assistance in removing tires from wheel rims. The tool has a rim engaging member with a lateral opening for engaging the flange of a wheel rim, and a tire engaging member movably coupled to the rim engaging member. The rim engaging member has a slot, within which a pin of the tire engaging member can slide to thereby allow the tire engaging member to rotate and translate relative to the rim engaging member. A roller is mounted on one end of the tire engaging member to exert a downward pressure on the tire sidewall, and a handle protrudes on an opposite end. A resilient roller is mounted on a lip portion of the rim engaging member to facilitate engagement between the member and the rim, and to prevent damage to the rim. The rim engaging member also may have a resilient roller for engaging a portion of the tire engaging member to enable smooth movement of the two pieces with respect to each other. The tool also has an adjustable tire bead hook member for supporting an upper tire bead while the tool is being used to remove the lower tire bead. This adjustable hook member can be adjusted to fit a variety of tire widths, including double-width tires.

22 Claims, 7 Drawing Sheets

U.S. PATENT DOCUMENTS

| | | | |
|---|---|---|---|
| 4,890,661 A | 1/1990 | Goebel | 157/1.3 |
| 4,919,184 A | 4/1990 | duQuesne | |
| 4,995,439 A | 2/1991 | Burge | 157/1.17 |
| 5,009,257 A | 4/1991 | Reeves | |
| 5,123,470 A | 6/1992 | Tran | |
| 5,143,134 A | 9/1992 | Tran | |
| 5,152,330 A | 10/1992 | Heise | |
| 5,191,934 A | 3/1993 | Wicklund | |
| 5,244,029 A | 9/1993 | Schoen et al. | |
| 5,265,661 A | 11/1993 | Tran | |
| 5,343,921 A | 9/1994 | Kusner | |
| 5,363,897 A | 11/1994 | Branch | |
| 5,472,034 A | 12/1995 | Corghi | |
| 5,495,882 A | 3/1996 | Trant | |
| 5,678,621 A | 10/1997 | Trant | |
| 5,740,848 A | 4/1998 | Goracy | |
| 5,806,578 A | 9/1998 | Gonzaga | |
| 5,971,052 A | 10/1999 | Kliskey | |
| 5,979,532 A | 11/1999 | Wridt | |
| 6,269,861 B1 | 8/2001 | Tran | |

* cited by examiner

TIRE REMOVAL TOOL

FIELD OF THE INVENTION

The invention relates to tools for assisting in the installation and removal of vehicle tires to/from wheel rims. In particular, the invention concerns a manually manipulated tool that is structured to engage the wheel rim flange and to manipulate the tire axially inwardly (relative to the wheel axis) from a position of engagement with the wheel rim flange. By assisting in separating the tire bead from the rim flange, the tool permits displacement of the tire relative to the rim in axial and radial directions, and thereby facilitates tire removal or installation.

BACKGROUND OF THE INVENTION

Various manual and powered tools for installing and removing tires from wheel rims are known. In a manual version such tools generally comprise an elongated pry bar handle, which is gripped by a user, and a flattened tool end for insertion between the tire bead and the wheel rim. The bead of a tire is generally wire reinforced and resists deformation. The bead is usually intended to seal a mounted tire to the wheel rim. For this purpose the bead has a diameter that is somewhat less than the diameter of the wheel rim flange and resides between the spaced flanges of the wheel rim. The bead resists stretching and is urged axially against the rim and sealed to the rim, inter alia, by pneumatic pressure in the tire or in an inner tube in the tire.

To remove a tire from a rim, the beads are unsealed or "broken" by moving them axially inwardly to disengage from sealing engagement with the rim. Then the two beads and sidewalls of the tire are passed axially over one of the rim flanges to remove the tire from the rim. Inasmuch as the diameter of the bead is less than that of the rim, this involves forcing the bead over the rim, by stretching the bead and/or deforming the bead into an oval and moving the longer dimension of the oval around the rim.

A working end of a tool is typically inserted between the tire bead and the rim flange. The user then applies pressure to the opposite handle end, using the tool as a lever and the wheel rim as a fulcrum. A short length of the tire bead is thereby lifted axially over the rim flange. This process is repeated in successive stages to increase the length of the bead on the axial outside of the rim flange, often using two or three pry tools around the periphery of the wheel rim to hold a portion of the bead against popping back over the rim flange while more of the bead is pried over the rim flange. After a certain angular span of the bead has been passed over the rim flange, prying at a distance from that span (e.g., at a diametrically opposite position) pulls the bead portion that is already outside the rim radially inwardly on the outside, rather than tending to pull that portion back between the rim flanges. It thus becomes easier to pass the remainder of the bead axially over the rim until the entire tire bead resides outside the rim.

Powered machines are available to serve the same function. Using such devices, the wheel is typically mounted on a spindle and the bead is broken. A short length of the tire bead is then pried over the rim flange, and a tool is placed under the lifted bead and engaged with a driving shaft on the spindle. An end of the tool is then passed circumferentially around the periphery of the wheel rim flange, pulling the entire bead over the rim flange.

With each of the above techniques, in order to fully remove the tire from the rim, the opposite side bead must be passed over the same rim flange as the first bead, in a similar manner. For installing a tire on a wheel rim, the foregoing process is carried out in reverse order, manually or using powered means.

Recently, truck tire manufacturers have introduced tires that are sized to take the place the traditional "dual tire" pairs used for trailer applications. These new tires are significantly wider than either of the single width tires they replace. As such, they can also have significantly deeper wheel rims, which can complicate the removal process when using current tools as described above.

Often, truck tires must be replaced on the roadside, such as when a truck driver experiences a flat on the highway. In such cases, the driver usually calls ahead for roadside assistance, rather than attempt to change the tire himself. Thus, a desirable tool for performing the above functions should be compact for easy storage and transportation. Additionally, since it can be expected that flats will occur in the winter, the tool should reduce or eliminate the need for the user to stand on the tire or wheel rim to remove and install a tire on a rim. This would reduce the chance that the user could slip and injure himself when applying the forces to the handle necessary to operate the tool.

Thus, there remains a need to provide an easy to use tool that is effective for installing and removing any of a wide variety of sizes of tires from their associated wheel rims, including newer truck tires having significantly wider wheel rims, and which can be used by the operator in a safe manner, even in inclement weather.

SUMMARY OF THE INVENTION

A tool is disclosed for removing a tire from a wheel rim defining a wheel axis, the tool comprising a rim engaging member positioned on the tool such that a first surface of the rim engaging member can be positioned to engage against the wheel rim, using a handle of the tool. A tire engaging member can be movably coupled on the tool relative to the rim engaging member, the tire engaging member having a first tire-engaging surface and an oppositely disposed handle engaging end, wherein the tire engaging member and the rim engaging member are movable relative to one another and carried on the handle. The tool can have a first position in which the rim engaging member is engaged with the wheel rim and the tire engaging member is engaged with a surface of the tire; wherein the tire engaging member is movable relative to the rim engaging member from the first position to impart a removal force in a direction parallel to the wheel axis to disengage a bead of the tire from the wheel rim.

The connection between the tire engaging member and the rim engaging member can comprise a pin slidable in a slot for allowing the tire engaging member and the rim engaging member to translate and rotate relative to one another. The rim engaging member can have a rim-flange engaging lip and an oppositely disposed rim-body contact part, the rim-flange engaging lip being hooked to engage over a flange of the wheel rim, and the rim-body contact part having a roller for bracing against a body portion of the wheel rim.

The tire engaging member can have a roller at a distal end of the tire engaging surface for reducing friction between the tire and the tire engaging member; wherein the roller has a roller axis that is oriented substantially perpendicular to the wheel axis. A distal portion of the tire engaging surface can be angled away from the rim engaging member.

The tire engaging member further can comprise a tire-bead engaging member disposed adjacent the handle engaging end, the bead engaging member being placed and configured to engage a first bead of the tire to support to the tire when engaging a second bead of the tire with the tire engaging surface. The tire-bead engaging member can be selectively movable along the tire engaging member and/or provided with plural engagement positions so as to receive and engage beads of a plurality of different tire sizes.

A tool for removing a tire from a wheel rim is disclosed comprising a rim engaging portion having at least one lip for engaging the wheel rim, and a tire engaging portion having a tire engaging end and a handle engaging end. The tire engaging portion can be slidably connected relative to the rim engaging portion via a pin and slot connection. The tire engaging end can further have a tire-engaging surface; wherein when the rim engaging portion is engaged with the wheel rim and the tire engaging surface is engaged with a surface of the tire, the tire engaging member can be movable along the rim engaging member via the pin and slot connection to impart a removal force to the tire in a direction substantially parallel to the wheel axis to axially disengage a bead of the tire from the wheel rim.

The pin and slot connection can enable the rim and tire engaging portions to translate and rotate with respect to each other to impart a removal force to the tire, wherein a component of the removal force is applied in a direction perpendicular to the wheel axis.

The rim engaging portion further can comprise a rim-body contact part disposed opposite to the lip, the lip further having a hooked shape for engaging a flange of the wheel rim, and the rim-body contact part further having a roller for bracing against a body portion of the wheel rim, wherein the roller has an axis oriented substantially perpendicular to the wheel axis.

The tire engaging end can have a roller disposed at a distal end thereof for reducing friction between the tire and the tire engaging end during use. A distal portion of the tire engaging surface can be angled away from the rim engaging portion. The tire engaging portion can further comprise a tire bead support member disposed adjacent the handle engaging end, the support member being placed and configured to engage a first bead of the tire to provide support to the tire when the tool is used to a second bead of the tire.

Furthermore, the tire bead support member can be movable along the tire engaging member and/or provided with plural engagement positions to receive and engage beads of a plurality of different tire sizes.

A method is also disclosed for removing a tire from a wheel rim having a wheel axis, the method comprising: providing a rim engaging member having a recess with first and second opposing lips configured to engage a rim of the wheel, the rim engaging member having a clamping position in which the first lip engages a flange of the wheel rim and the second lip engages a wall portion of the wheel rim to clamp the rim engaging member to the rim; providing a tire engaging member having a tire engaging surface for imparting a removal force to a tire using a handle, the tire engaging member connected to the rim engaging member for sliding movement thereon; pressing the tire engaging surface between the rim and the tire in a direction substantially parallel to the wheel axis until the rim engaging member is in the clamping position; and moving the tire engaging member on the rim engaging member in a first direction by rotating the handle toward the wheel axis, the movement imparting a removal force to the tire in a direction substantially parallel to the wheel axis to lift a tire bead over the flange of the wheel rim.

The connection between the tire engaging member and the rim engaging member can comprise a slot and pin connection that allows the tire engaging member and rim engaging member to translate and rotate with respect to each other. The rim engaging member can have a rim-flange engaging lip and an oppositely disposed rim-body contact part, the rim-flange engaging lip being hooked to engage a flange of the wheel rim, and the rim-body contact part having a roller for bracing against a body portion of the wheel rim, the roller having an axis oriented substantially perpendicular to the wheel axis. The tire engaging member can have a roller at a distal end of the tire engaging surface for reducing friction between the tire and the tire engaging member during use, the roller having an axis oriented substantially perpendicular to the wheel axis.

The moving step further can comprise imparting a removal force to the tire, the removal force having a first force component substantially parallel to the wheel axis and a second force component substantially perpendicular to the wheel axis. The method can further comprise the steps of moving the tire engaging member in the first direction by an amount sufficient to lift the tire bead over the wheel flange; moving the tire engaging member on the rim engaging member in a second direction that is opposite the first direction by an amount sufficient to engage the tire bead with a tire bead support member disposed on a handle engaging portion of the tire engaging member; moving the tire engaging member on the rim engaging member in the second direction until the tire engaging surface is engaged with a second tire bead, wherein the engagement between the tire bead support member and the first tire bead supports the tire so that the tire engaging surface can be engaged with the second tire bead; and moving the tire engaging member on the rim engaging member in the first direction by rotating the handle toward the wheel axis, the movement imparting a removal force to the tire in a direction substantially parallel to the wheel axis to lift the second tire bead over the flange of the wheel rim.

BRIEF DESCRIPTION OF THE DRAWINGS

Other objects, advantages and novel features of the invention will become more apparent from the following detailed description of the invention when considered in conjunction with the accompanying drawings, wherein.

DETAILED DESCRIPTION

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 1:
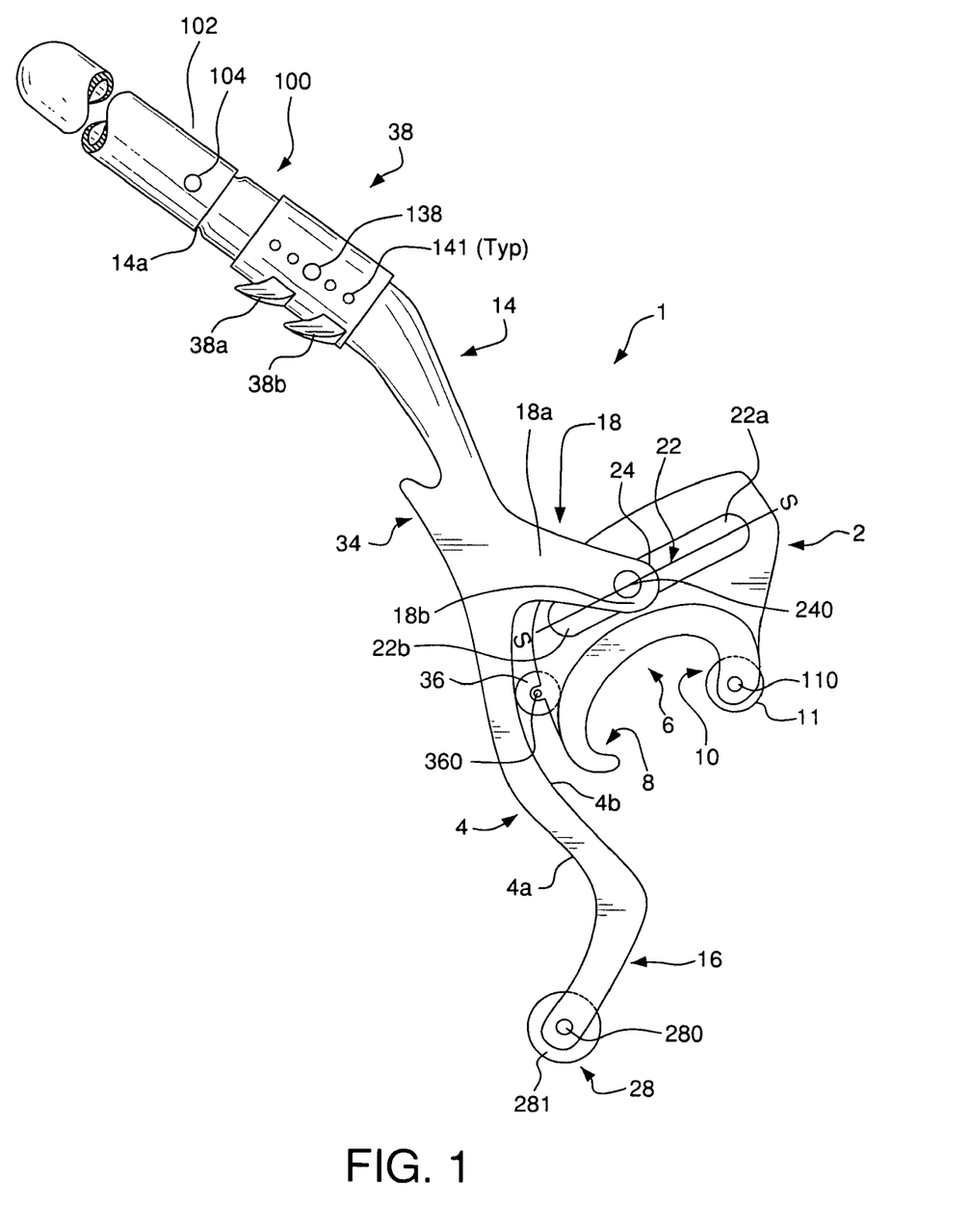
FIG. 1 is a side view of a tool according to the invention for removing and installing a tire.
Figure 1A:
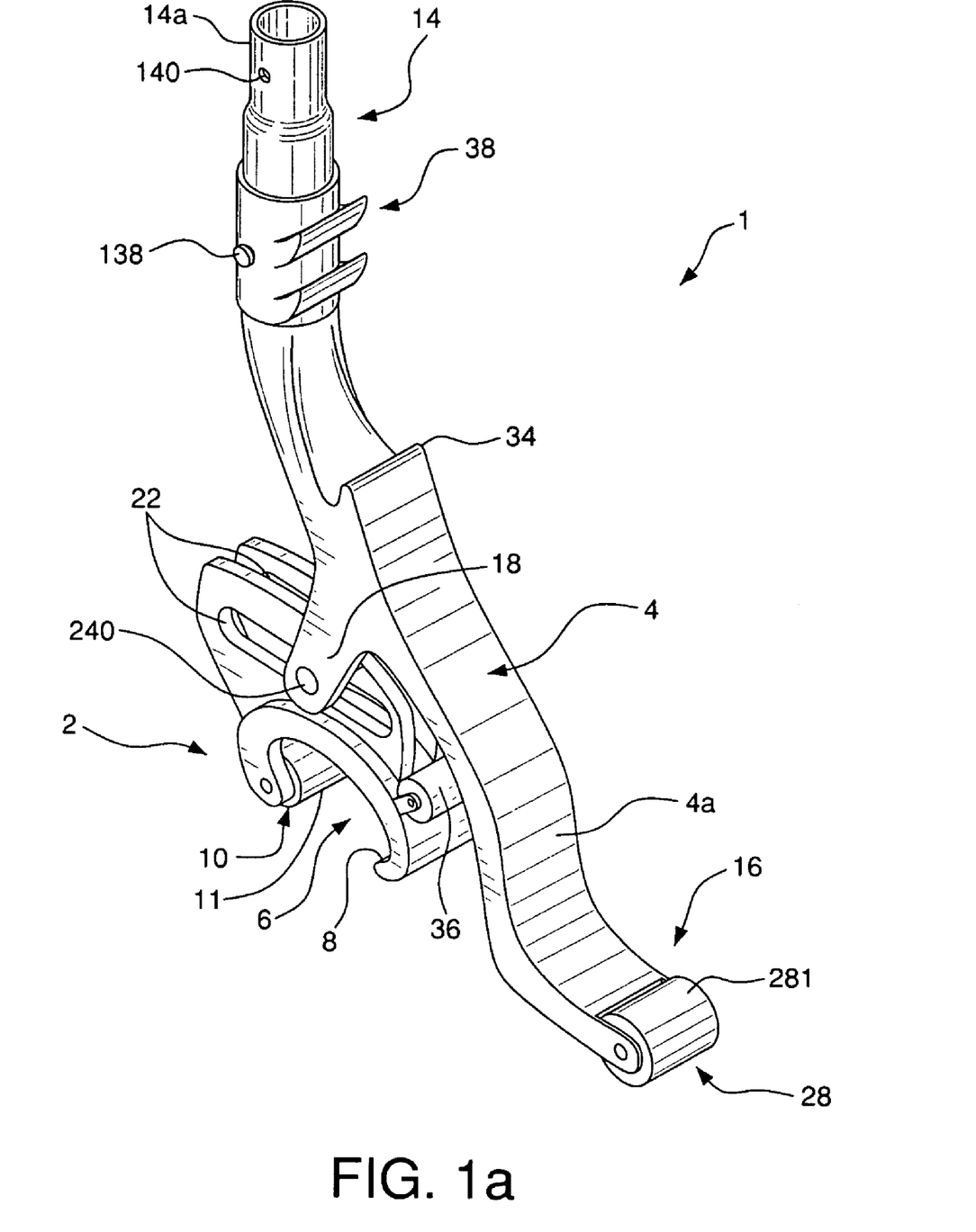
FIG. 1a is a perspective view of the tool of FIG. 1.
Figure 3:
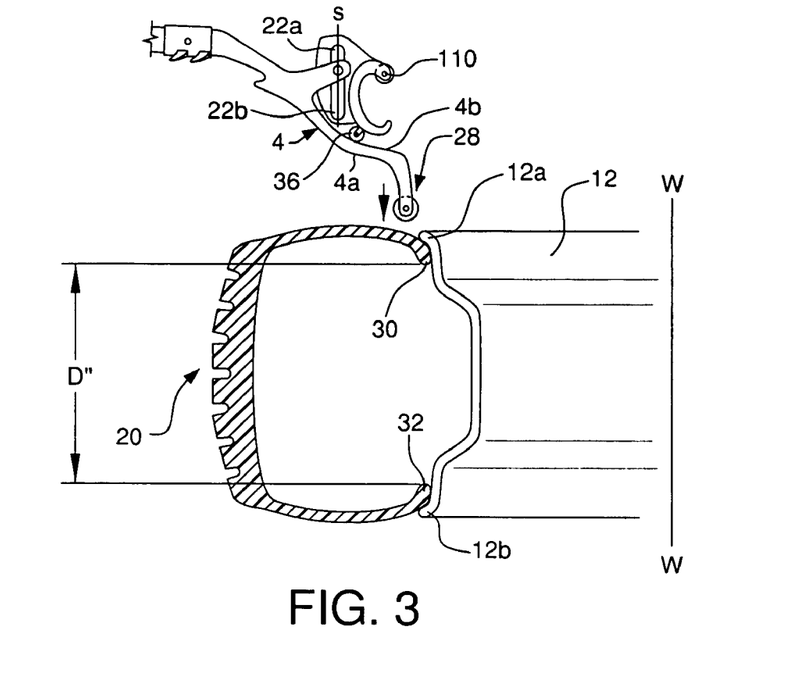
FIG. 3 is a cross-sectional view through a section of the tire, showing the relative position of the tool of FIG. 1 in an installation position with respect to the tire and associated wheel rim.

Referring to FIGS. 1 and 1a, a tool 1 is provided for facilitating easy hand-operated removal of a vehicle tire 20 on a wheel rim 12 (FIG. 3). The tool 1 has a wheel rim engaging portion 2 and a tire engaging portion 4. The rim engaging portion 2 has a generally C-shaped cavity 6 with a pair of opposed first and second engaging lips 8, 10, at least one of which is configured to engage an upper flange 12a of the wheel rim 12. The tire engaging portion 4 generally comprises a handle engaging end 14, an oppositely disposed tire engaging end 16 and an intermediate portion 18 that is configured to cooperate with the rim engaging portion 2. The tire engaging portion 4 is configured to physically engage the tire 20 to lift it up over the rim 12. The rim- and tire-engaging portions 2, 4 are connected together via a slotted 22 and pinned 240 connection, which enables the pieces to move with respect to each other. This arrangement allows the tool 1 to be firmly fixed to the wheel rim 12 (via rim engaging portion 2) while allowing the tire engaging portion 4 to move with respect to the tire 20, thus maximizing the engaging and lifting efficiency of the tool 1.

Figure 4:
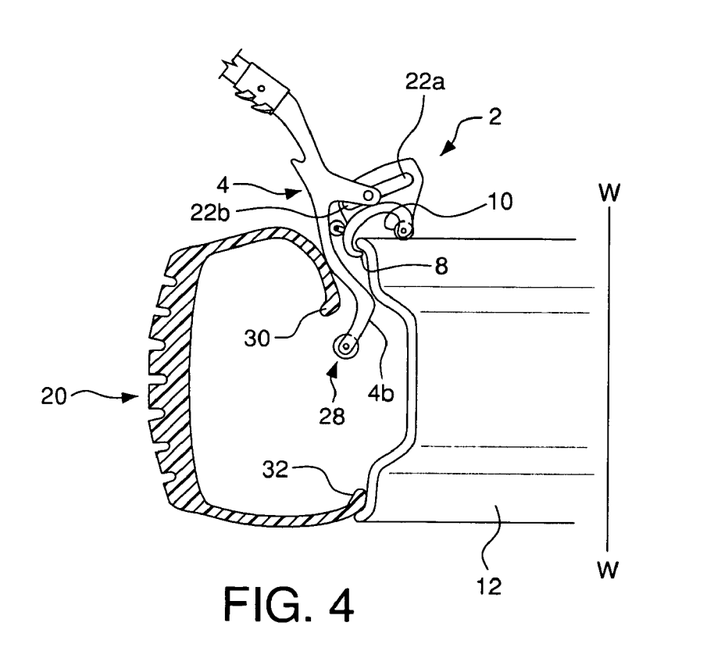
FIG. 4 is a cross-sectional view through a section of the tire, showing the tool of FIG. 1 provisionally engaged with the tire and wheel rim.
Figure 5:
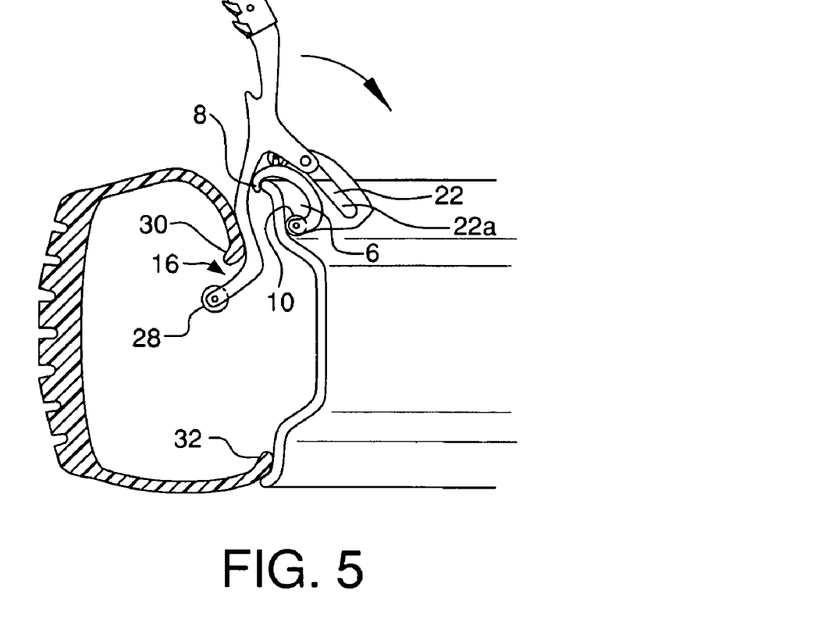
FIG. 5 is a cross-sectional view through a section of the tire, showing the tool in the partially rotated position lifting an upper bead of the tire toward a top flange of the wheel rim.
Figure 6:
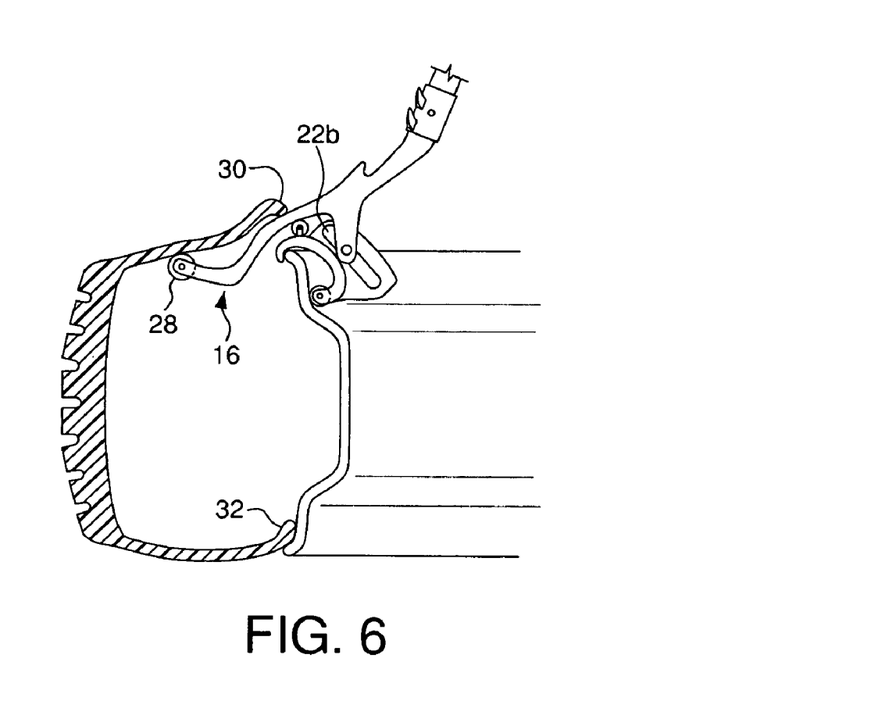
FIG. 6 is a cross-sectional view through a section of the tire, showing the tool lifting a portion of the upper tire bead beyond the top flange of the wheel rim.
Figure 7:
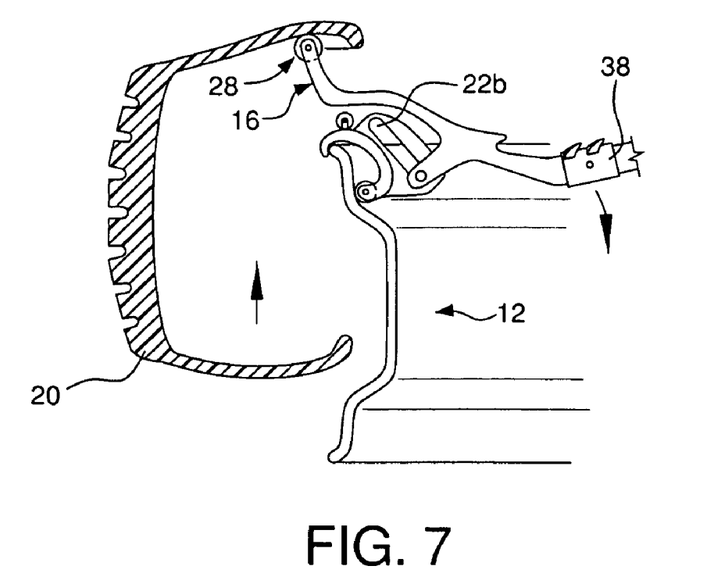
FIG. 7 is a cross-sectional view through a section of the tire, showing the tire removal tool lifting the entire upper tire bead over the top flange of the wheel rim.

Referring now to FIGS. 3–5, in use the tool 1 is oriented so that the tire engaging part 28 points generally downward, and then the tire engaging portion 4 is pressed into the joint between the wheel rim 12 and the upper bead 30 of the tire 20 to break the seal between the bead and the rim. The tire engaging portion 4 is then pressed further down between the rim and tire until the cavity 6 contacts the upper flange 12a of the rim 12. Further downward movement of the tool 1 causes the rim engaging portion 2 to rotate slightly until the first engaging lip 8 of the rim-engaging portion cavity 6 securely engages the upper flange 12a of the rim 12, locking the tool 1 to the rim 12. Once the tool 1 is fully engaged with the tire and rim, as shown in FIG. 5, the tool handle 32 can be levered to impart an upward force on the tire's upper bead 30 (via the tire engaging portion 4), and through the continued application of force the upper bead 30 is slid up and over the upper flange 12a of the rim 12, disengaging the upper bead 30 from the wheel rim 12 (FIG. 7). The process is then repeated for the lower bead 32. A hook member 34 is provided on the handle engaging end 14 of the tool to allow the tire engaging portion 4 to easily slide beneath the lower bead 32 of the tire 20. The user simply engages the upper bead with the hook (FIG. 8), to provide vertical support for tire 20, thus preventing the tire from falling back down onto the rim 12 when the tire engaging portion 4 is pressed into engagement with the lower bead 32.

Referring again to FIGS. 1 and 1a, tool 1 has tire and rim engaging portions 4, 2 as previously noted. The tire engaging portion 4 can have a handle engaging end 14 that is configured to engage an elongated handle member 100. In the illustrated embodiment, the handle engaging end 14 has a reduced diameter portion 14a configured to receive the tubular end 102 of the handle member 100. A pinned connection can be provided to axially and rotationally lock the handle member 100 to the handle engaging end 14 via pin member 104. Thus, the handle 10b0 and tool 1 can be disassembled for convenient storage simply by removing pin 104. The pieces can then be reassembled at the work site, again by sliding the handle over the reduced diameter portion and insertion pin 104 through the associated holes in the pieces. A suitable handgrip part, for example a tubular grip or closed end U-shaped member or the like, can be attached to a distal portion of the handle member 100. The handle member 100 should be sufficiently long so that a user of the tool 1 can develop adequate leverage to pass the tire bead 30, 32 over the rim 12 of a tire 20 by using the handle member as a lever arm as hereinafter described, without having to apply excessive force at the handle end. The handle member 100 and tool 1 are preferably made from a corrosion resistant steel for adequate strength and durability.

As can be seen in FIG. 3, a conventional pneumatic tire 20 for motor vehicles and the like has a bead 30, 32 along the radial inner edge of the tire, which engages with axial pressure, due to tire inflation, against the radially outermost surface of the upper and lower wheel rim flanges 12a, b on opposite sides of the wheel. The beads 30, 32 and the rim flanges 12a, b in each case are continuous circles, and the bead is slightly smaller in diameter than the rim flange. The bead is sufficiently resilient that with sufficient force the bead can be stretched in circumference to be forced over the rim flange.

The tool 1 includes a tire engaging portion 4 having a handle engaging end 14 and an oppositely disposed tire engaging end 16. The tire engaging end 15 is configured to engage various parts of the tire during use (e.g., inner and outer side walls, beads), but will generally contact one of the tire beads 30, 32. As previously noted, a rim engaging portion 2 is provided to affirmatively engage the tool 1 with the wheel rim 12 to facilitate proper positioning of the tire engaging portion 4 and also to ensure safe operation of the tool by preventing slippage. The rim engaging portion 2 has a pair of slots (FIG. 1*a*) configured to receive a pin or pins 240 disposed within an intermediate portion 18 of the tire engaging portion 4 to allow sliding movement of the portions 2, 4 with respect to each other. On its opposite surface, the rim engaging portion 4 has a generally C-shaped cavity 6 for engaging a targeted wheel rim 12 as previously noted.

The tool 1 is configured to successively engage both the upper and lower beads 30, 32 of a targeted tire to remove the tire from its rim. When removing the upper bead 30 from the rim, the tire engaging end 16 can simply be inserted between the rim and the tire and the handle rotated to lever the bead up and over the top rim flange 12*a*. To engage the lower bead, however, the tire engaging end 16 is pressed downward into the space between the tire and the rim until it contacts the inner sidewall portion of the tire, adjacent to the lower bead. Additional downward pressure, combined with inward rotational movement of the tire engaging end 16, causes the tire engaging end to slide (or roll if a roller 28 is provided on the tire engaging end) along the inside of the tire until the tire engaging end 16 slips beneath the lower bead 32. When downward pressure is applied to the tire during this operation, however, the tire can tend to simply flex or fall downward on the rim, thus preventing the tire engaging end 16 from sliding beneath the lower bead 32.

Figure 8:
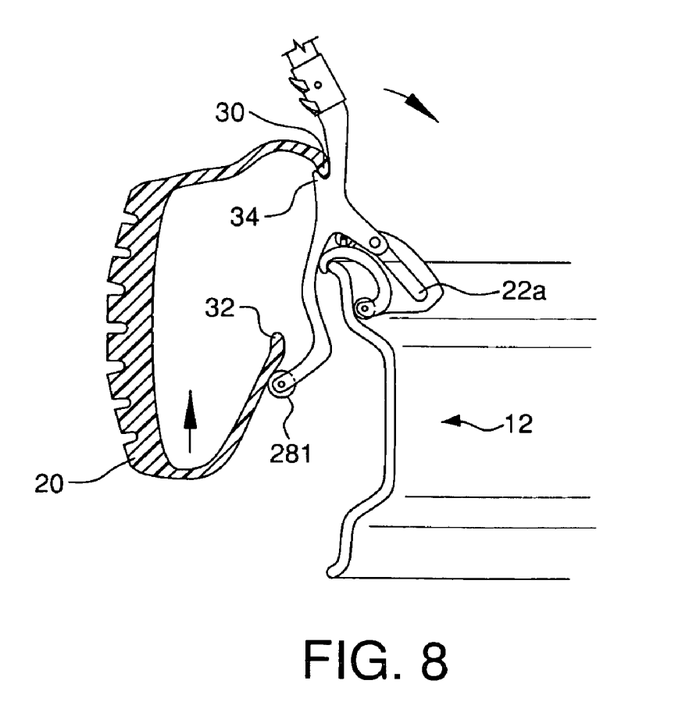
FIG. 8 is a cross-sectional view through a section of the tire, showing the bead hook engaging the upper tire bead and the tire engaging portion positioned below the lower tire bead.

To address this, a hook element 34 can be provided on tire engaging portion 4 of the tool, near the handle-engaging end 14. This hook 34 can be configured to automatically engage and hold the upper bead 30 in a desired vertical position while the tire engaging end 16 is pressed down below the lower bead 32. This engagement is shown in FIG. 8. With normally-sized tires, the bead hook 34 disposed between the tire- and handle-engaging portions 16, 14 automatically becomes engaged with the upper bead 32*a* when the tire engaging member 16 is inserted between the lower bead 32*b* and the rim 12.

As can be seen in FIG. 1, the tire engaging end 16 can be angled relative to the rest of the tire engaging portion 4. This angulation facilitates insertion of the tool 1 between the rim and tire by allowing the tire engaging end 16 to be oriented substantially parallel to the wheel axis W—W (FIG. 3) while still presenting the cavity 6 of the rim engaging portion 2 toward the upper flange 12*a* of the wheel rim. This angulation also enhances the efficiency of the tire removal process by shifting the point of engagement between the tire engaging end 16 and the tire 20 upward, thereby maximizing the allowable travel of the handle 100 in levering the tire off the rim.

Preferably the tire engaging end 16 has a tire engaging part 28 at the distal end thereof comprising at least one rotatable roller 281 for decreasing sliding friction between the end 16 and the tire 20 to minimize potential damage to the tire. In one embodiment the rotatable roller 281 is a single cylindrically shaped member having an axle 280 such as a pin or the like which is retained in the tire engaging end 16 by an interference fit. Alternatively, the roller 281 may have a conical or spherical shape, and may include more than one roller, such as two or more spherical members, etc. The roller 281 can be made of any appropriate material such as metal, polymer, rubber, etc. In a preferred embodiment, the roller 281 comprises a polymer material.

The intermediate portion 18 of the tire engaging portion 4 can have proximal and distal ends 18*a, b* and can be angled relative to the tire engaging end 16, as described previously, thus forming a Y-shaped extension. The proximal end 18*a* connects to the tire engaging portion 4 at a point located approximately midway between the handle- and tire-engaging ends 14, 16, while the distal end 18*b* engages and cooperates with the rim-engaging portion 2. Thus, distal end 18*b* can have a transverse pin 24 that is disposed within, and slides with respect to, slots 22 to allow the tire engaging portion 4 and the rim engaging portion 2 to move along a predetermined path with respect to each other. In a preferred embodiment, the distal end 18*b* can further have a rotatable roller 24 disposed about the pin 240 for engaging the inner surfaces of the slots 22 to minimizing friction between the pieces. This roller 24 can be made of any appropriate material, including metals, polymers and the like, and it can be removable to allow a new roller to be installed if the existing piece becomes worn or damaged. In a preferred embodiment, the roller 24 is made of a metal material to provide maximum durability.

The slots 22 (FIGS. 1, 2*c*, 2*d*) in the rim engaging portion 2 can be generally elongated and can have a slot axis "S—S" that is oriented so that when the rim engaging portion 2 engages the wheel rim 10, the slot is substantially parallel to the wheel axis W—W (see FIG. 3). Once the rim engaging portion 2 is fully engaged with the rim 12 (FIG. 5), the slots are oriented at approximately 45 degrees with respect to the wheel axis, thus maximizing the available vertical and horizontal travel of the handle 100. In the illustrated embodiment, the slot orientation allows the tire engaging portion 4 to move inward with respect to the wheel and tire, thus imparting a slight inward force to the tire as it is being moved up and over the top flange of the wheel rim 12. It is noted that alternative orientations of the slots 22 are contemplated, and thus the actual orientation can be different depending upon the desired application. Also, although the slots 22 are illustrated as being generally linear, they can have other shapes, such as curved, stepped, etc., as appropriate to provide a desired movement of the tire engaging member 4 during use.

As previously noted, the rim-engaging portion 2 has a generally C-shaped cavity 6 with a pair of opposed engaging lips 8, 10. The first engaging lip 8 is disposed at one end of the cavity 6 and is sized and configured to cup the top wheel rim flange 12*a* to axially engage the rim engaging portion 2 with the rim 12. The second engaging lip 10 abuts an intermediate portion of the wheel rim 12 at a location below the top flange 12*a*, as shown in FIG. 5. In a preferred embodiment, the second engaging lip 10 comprises a rotatable roller 11 at the end thereof for minimizing potential damage to the wheel rim in use. This roller 11 can be similar to rollers 24, 281 described in relation to the tire and rim engaging portions 16, 18. In a preferred embodiment, roller 11 comprises a polymer or other material that is substantially softer than the metal wheel rim material to maximize protection of the rim surfaces.

Figure 2A:
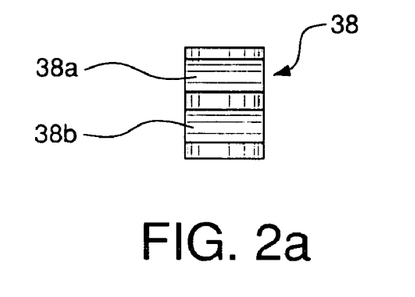
FIG. 2a is a partial front view of a hook portion of the tool of FIG. 1.
Figure 2B:
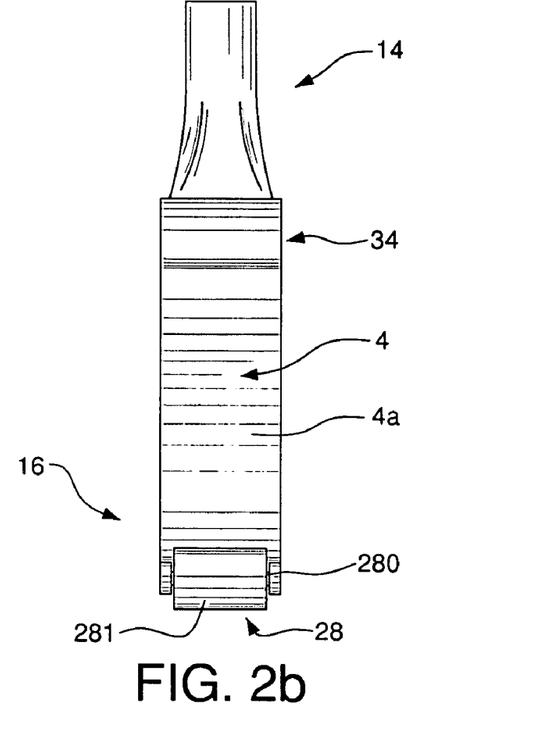
FIG. 2b is a front view of the tire engaging portion of the tool of FIG. 1.
Figure 2C:
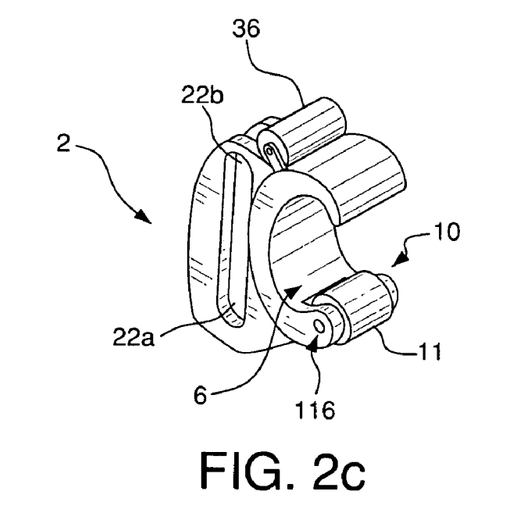
FIG. 2c is a perspective view of the rim engaging portion of the tool of FIG. 1.
Figure 2D:
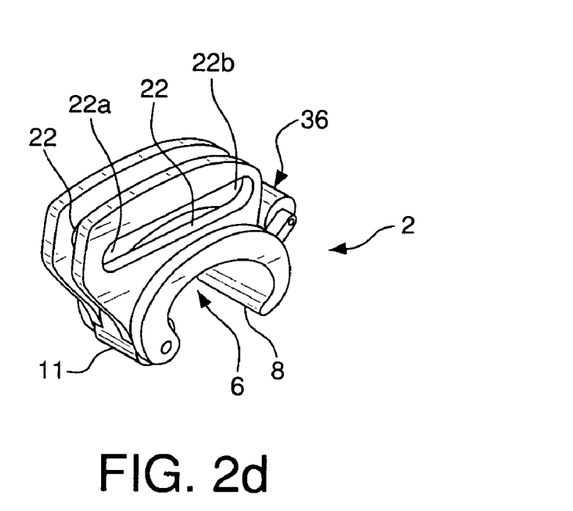
FIG. 2d is a reverse perspective view of the rim engaging portion of FIG. 2c.

As previously noted, when the tire engaging portion 4 moves with relation to the rim engaging portion 2, the two pieces contact each other in two distinct locations. The first location is between the slots 22 and pin 240 or roller 24. The second location is between the back face 4*b* of the tire engaging portion 4 and an outer surface of the rim engaging portion 2. Referring to FIGS. 1, 2*c* and 2*d*, an outer roller member 36 is positioned on the rim engaging portion 2 so as to contact the back face 4*b* between the intermediate portion 18 and the tire engaging end 16. The roller member 36 is connected to the rim engaging portion 2 via a press-fit pin 360. In use, the roller 36 reduces friction between the portions 2, 4 when they move with respect to each other, thus making the tool I easier to operate and also reducing wear. The roller 36 can have any or all of the features previously described in relation to rollers 24, 26, 281, and can be made of a metal material to maximize durability. In an alternative embodiment, the roller 36 can be made of a polymer or soft material, to provide smooth operation of the device and to minimize wear of tool surfaces.

It is noted that this roller 36, as well as the previously described rollers 24, 26, 28 can be replaced to allow the tool to be refurbished to provide smooth long term use and operation. Such replacement can be easily accomplished through the removal/reinstallation of the press-fit pin associated with the roller. Additionally, any or all of the rollers can be replaced with metal or non-metal wear surfaces, such as discretely shaped and sized pieces of material that can be easily replaced when worn. In one example, solid or non-solid plugs of polymer material can be embedded in the appropriate tool surface to perform a function similar to that of one or more rollers.

In use, the intermediate portion 18 can initially be disposed in a proximal end portion 22a of slot 22, as illustrated in FIG. 3. Once the tire engaging end 16 has been inserted between the tire and wheel, and the rim engaging portion 2 engages the wheel rim 12, further downward movement of the tire engaging portion 16 is made possible through the downward sliding of the intermediate portion 18 within the slots 22 (FIG. 4) until the pin 240 and roller 24 are positioned at the distal end 22b of the slots 22. This allows the user to position the front face 4a (FIGS. 1a, 2b) of the tire engaging end 16 directly against the upper bead 30. Thereafter, when the user rotates the handle 100 toward the wheel axis W—W, an upward force is imparted directly to the bead 30. Further rotation of the handle in the same direction causes the tire engaging portion 4 to rotate upward, with the entire tire engaging portion 16 "carrying" the tire upward through the reverse movement of the tire engaging portion 16 along slots 22 (see FIGS. 4–7). The pin/slot connection also allows the tire engaging portion 16 to move inward with respect to the wheel so as to impart a slight inward force to the tire as it is being lifted over the upper flange 12a of the rim. This movement is described in reference to FIGS. 5 and 7. As shown in FIG. 5, when the user first begins to rotate the handle 100 to impart the desired upward force to the tire, the pin 240 is located adjacent the distal end portions 22b of the slots 22. As the user continues to rotate the handle 100, the tire engaging portion 4 moves with respect to the rim engaging portion 2 via the pin/slot interaction, so that pin 240 and roller 24 move within the slots 22 toward the proximal slot ends 22a. When the handle 100 has been rotated an amount sufficient to disengage the upper bead 30 of the tire from the upper flange 12a of the wheel rim, the pin 240 and roller 24 are disposed adjacent to the proximal end portion 22a of the slots 22, as shown in FIG. 7.

This sliding arrangement between the tire engaging portion and the rim engaging portion provides significant flexibility in the use of the tool 1, and also provides increased safety in using the tool because the rim engaging portion provides a positive lock on the wheel rim. Prior tools merely contact the wheel rim and do not provide positive engagement between the tool and the rim. The result of such a lack of positive engagement is the increased potential for the tire engaging portion 16 of the tool to slide down into tire during use, thus limiting the effectiveness of the handle in separating the tire from the wheel. Further, since the tool will undoubtedly be used in roadside applications, it should engage the wheel rim as stably as possible so that in situations of snow and ice, which are prevalent during the winter months in northern climates, the chance that the tool or operator will slip will be substantially reduced.

The tool 1 can be adapted to work equally well for removing tires from modern wide truck tires, such as the new single tires that are designed to take the place of two standard tires (e.g. the X One XTE tire by Michelin). Tires of this size can have depths up to twice that of standard dual tires (see dimension "D" in FIG. 3), which indicates, which can render the hook element 34 ineffective in holding the upper bead sufficiently high to enable the tire engaging end 16 to be pressed down below the lower tire bead 32. This is because the distance between the upper and lower tire beads on such a tire may be greater than the distance between the hook element 34 and the tire engaging end 16. As such, the user may be required to lift up on the tire while moving the tire engaging end 16 beneath the lower tire bead 32. This is neither convenient nor safe.

Figure 10:
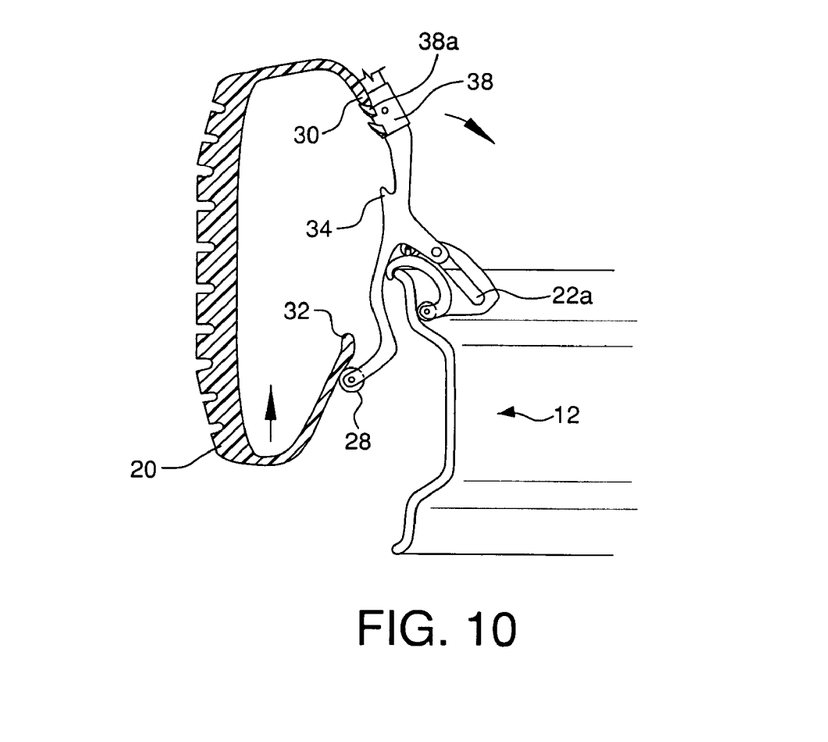
FIG. 10 is a cross-sectional view through a section of a double-width tire, showing one of the hooks of the adjustable bead hook element engaging the upper tire bead, and the tire engaging portion of the tool positioned below the lower tire bead.

In order to accommodate these increased depth tires, the handle engaging portion 14 of the tool can have an adjustable bead hook element 38 slidably disposed thereon to provide a set of hook elements 38a, b that are spaced from the tire engaging end 16 by a distance greater than the distance between the upper and lower tire beads 30, 32. Thus, as illustrated in FIG. 10, when the upper bead 30 of the tire is hooked onto a selected hook element 38a, b, the tire engaging end 16 can be positioned below the lower tire bead 32 without the need for the user to hold onto the tire. It is noted that for unusually deep tires it may be necessary for the user to manually lift the tire up onto the desired hook 38. Once this is done, however, the tire engaging member 16 can be operated as before to disengage the second bead 32b from the rim.

The adjustable bead hook element 38 can have one or more individual bead hooks 38a, b (FIG. 2a) to provide a variety of positions to engage the upper tire bead 30 of a tire to perform the same function as hook 34, for larger depth tires. As noted, the bead hook element can be slidable along a portion of the length of the tool 1 to provide an additional degree of adjustability. The element 38 can be locked in one of a variety of positions using a pin 138 disposed through one of a plurality of corresponding holes 141 in the handle engaging end 14 of the tool 1.

It is noted that while the tool 1 is shown as having a bead hook element 38 with a pair of individual hook elements 38a, b, alternative arrangements are also contemplated, such as providing multiple fixed hook elements at spaced intervals along the tool 1.

Successive steps for use of the tire removal tool according to the invention to remove a tire 20 from a rim 12 are shown in FIGS. 3–9. The tire 20 and rim 12 are preferably disposed horizontally on the ground, and can be deflated sufficiently that the bead can be pushed back from the rim flange. As illustrated in FIG. 3, the tool 1 can be held by the handle 100 in a manner so as to orient the tire engaging part 28 in a generally downward direction, and so that the rim engaging portion 2 hangs loosely from the pin 240 in the intermediate portion 18 so that the cavity 6 faces the upper rim flange. The tire engaging part 28 is then pressed downwardly between the upper tire bead 30, as shown in FIG. 4, and the upper wheel rim flange 12a, in a direction substantially parallel to the wheel axis "W—W." Typically, it will first be necessary to use a separate tool to break the seal between the tire and the rim. This often requires the application of significant force, which can be applied using a "bead breaker," or other tool prior to insertion of the tire engaging part 28.

During the initial insertion process, the rim engaging portion 2 hangs from the pin 240 of the intermediate portion 18 in the manner illustrated in FIGS. 1 and 3. In this position, the second engaging lip 10 of the rim engaging portion 2 is located above the first engaging lip 8, and the cavity 6 faces away from the back face 4*b* of the tire engaging portion 4. Thus positioned, the tire engaging portion 4 can be driven down between the rim 12 and tire 20 until the cavity 6 contacts the rim 12 adjacent its upper flange 12*a*. As the tire engaging portion 4 is driven down further between the rim and the tire, the rim engaging portion 2 and tire engaging portion 4 slide with respect to each other via the slot/pin interface, and the rim engaging portion 2 rotates about the pin 240 until the first engaging lip 8 engages the upper flange 12*a* of the rim, and the second engaging lip 10 rests against an inner side portion 12*c* of the rim 12.

FIG. 5 shows the tool 1 in the resulting fully engaged position, in which the first engaging lip 8 is located above the second engaging lip 10 and the cavity 6 is facing the back face 4*b* of the tire engaging portion. Further, the pin 240 is located at or near the proximal end 22*a* of the slot 22 in the rim engaging portion 2. Likewise, in this position the tire engaging portion 4 is fully engaged with the tire such that the upper bead 30 of the tire is in contact with the front face 4*a* of the tire engaging portion 4. In this position, the handle is substantially parallel to the plane of the ground upon which the tire is resting so as to provide maximum levering movement to the tool. The tool 1 may now be used to remove the tire from the rim.

The first step in the tire removal process is to separate the upper bead 30 from the upper flange 12*a* of the rim. Thus, the user can apply a rotational force to the handle 100 to press the front face 4*a* of the tire engaging portion 4 against the upper bead 30. This force causes the tire engaging portion 4 to move both upward (due to the lifting of the handle) and slightly inward (due to the movement of the tire engaging portion 4 along the slots 22 in the rim engaging portion 2). This combination of rotational and sliding movement continues until the pin 240 in the intermediate portion 18 engages the proximal end 22*a* of the slot 22. At this point, sufficient force and displacement will have been applied to the upper bead 30 to pull it up and over the upper flange 12*a* of the rim.

As illustrated and described, the rim engaging portion 4 serves three functions. First, it serves as a pivot member for the tire engaging portion 2, translating the lifting motion of the handle 100 into an upward force on the upper tire bead 30. Second, it serves to secure the tire engaging portion 4 to the rim 12, thus preventing the tire engaging member 4 from sliding down into the tire thus diluting the levering action applied to the upper tire bead 30. Third, it allows the tire engaging portion 4 to translate inward, toward the center of the wheel, to provide a moving pivot point to provide substantially constant leverage against the upper tire bead 30 over the entire range of motion of the tire engaging portion 4. Prior to maximum rotation of the tool 1 to the point where the handle 100 contacts the tire 20 at a point diagonally opposite from where the tire engaging portion 2 is inserted, the entire circumference of the upper tire bead 30 is pulled beyond the wheel rim flange. Accordingly, in one quick lever-like motion involving inserting the tool 1 and rotating the tool handle 100 across the tire, the entire upper bead 30 is pulled over the upper rim flange 12*a*. The resulting location of the tire 20 with respect to the wheel rim 12 is as shown in FIG. 7, where the upper tire bead 30 is removed from the wheel rim 12 and lower tire bead 32 remains between the upper wheel rim flange 12*a* and lower wheel rim flange 12*b*, keeping the tire captive on the wheel.

After the entire upper bead 30 of the tire is lifted up over the upper rim flange 12*a*, the tool 1 can be repositioned to remove the lower bead 32 from the rim 12. Thus, handle 100 is rotated back toward its original engaged position (FIG. 5). This movement causes the tire engaging portion 4 to translate with respect to the rim engaging portion 2 until the pin 240 of the tire engaging portion 4 is located adjacent the distal end 22*a* of the slot 22 in the rim engaging portion 2. As the tire engaging portion 4 approaches this position, the hook 34, which located near the handle engaging end 14 of the tool, slides beneath the upper bead 30, hooking the upper bead 30 and preventing the tire 20 from sliding back downward on the rim 12. Simultaneous to the engagement of the hook 34 with the upper bead 30, the tire engaging part 28 contacts an inner surface 31 of the tire adjacent to the lower bead 32. Rotating the handle further toward its original position causes the tire engaging part 28 to slide along the inner surface of the tire until it slides beneath the lower bead 32, as shown in FIG. 8. It is noted that providing a roller 281 at the end of the tire engagement part 28 can make it much easier to move the tire engagement part 28 beneath the lower bead 32 due to the reduced friction associated with the rolling contact between the tire and tool.

Figure 9:
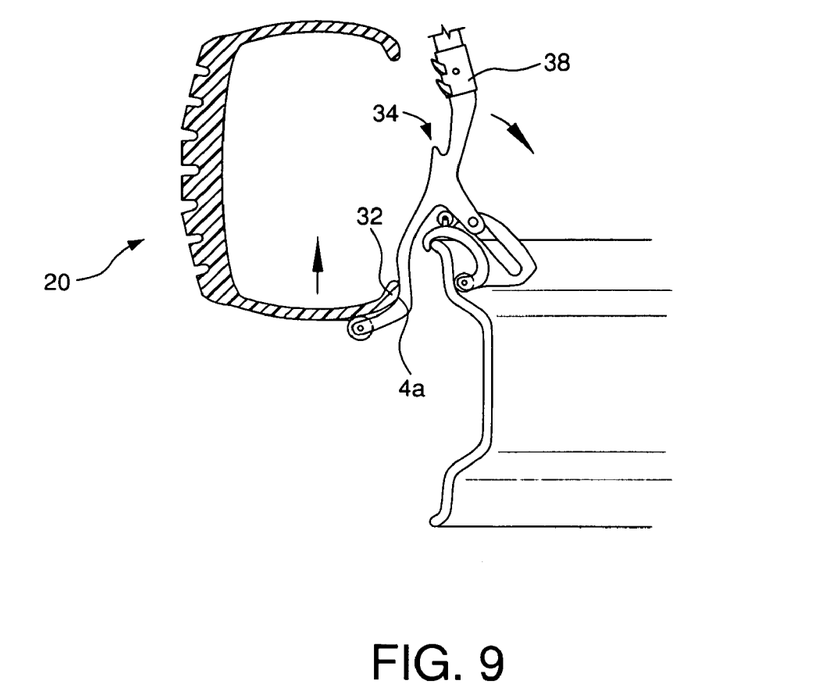
FIG. 9 is a cross-sectional view through a section of the tire, showing the tool in the partially rotated position lifting the lower bead beyond the top flange of the wheel rim.

Once the tool is positioned so that the front face 4*a* of tire engaging portion 4 engages the lower bead 32, the user can lift up on the handle 100 and remove the lower bead 32 from the rim 12 in the same manner as described for the upper bead 30 (FIGS. 8 and 9).

When removing a particularly wide (i.e. deep) tires, such as those previously described as being used to replace the standard dual tire arrangement (e.g. X One XTE tire by Michelin), the user can employ one of the hook members 38*a*, *b* associated with the an adjustable bead hook element 38. It is noted that it may be necessary for the technician to manually lift the upper bead 30 into engagement with the appropriate hook 38*a*, *b*.

As part of any or all of the above removal steps, an appropriate oil or other lubricant may be applied to the tire surface immediately adjacent to the beads in order to reduce the friction between the beads 30, 32 the upper flange 12*a* of the rim 12 and the tool 1.

Accordingly, it should be understood that the embodiments disclosed herein are merely illustrative of the principles of the invention. Various other modifications may be made by those skilled in the art which will embody the principles of the invention and fall within the spirit and the scope thereof.

The invention claimed is:

1. A tool for removing a tire from a wheel rim defining a wheel axis, comprising:
   a rim engaging member positioned on the tool such that a first surface of the rim engaging member can be positioned to engage against the wheel rim, using a handle of the tool;
   a tire engaging member movably coupled on the tool relative to the rim engaging member, the tire engaging member having a first tire-engaging surface and an oppositely disposed handle engaging end, wherein the tire engaging member and the rim engaging member are movable relative to one another via a pin slidable in a slot;

the tool having a first position in which the rim engaging member is engaged with the wheel rim and the tire engaging member is engaged with a surface of the tire;

wherein the tire engaging member is movable relative to the rim engaging member from the first position to impart a removal force in a direction parallel to the wheel axis to disengage a bead of the tire from the wheel rim.

2. The tool of claim 1, wherein cooperation between the pin and slot allows the tire engaging member and the rim engaging member to translate and rotate relative to one another.

3. The tool of claim 1, wherein the rim engaging member has a rim-flange engaging lip and an oppositely disposed rim-body contact part, the rim-flange engaging lip being hooked to engage over a flange of the wheel rim, and the rim-body contact part having a roller for bracing against a body portion of the wheel rim.

4. The tool of claim 1, wherein the tire engaging member has a roller at a distal end of the tire engaging surface for reducing friction between the tire and the tire engaging member, wherein the roller has a roller axis that is oriented substantially perpendicular to the wheel axis.

5. The tool of claim 1, wherein a distal portion of the tire engaging surface is angled away from the rim engaging member.

6. The tool of claim 1, wherein the tire engaging member further comprises a tire-bead engaging member disposed adjacent the handle engaging end, the bead engaging member being placed and configured to engage a first bead of the tire to support to the tire when engaging a second bead of the tire with the tire engaging surface.

7. The tool of claim 6, wherein the tire-bead engaging member is one of selectively movable along the tire engaging member and provided with plural engagement positions so as to receive and engage beads of a plurality of different tire sizes.

8. A tool for removing a tire from a wheel rim, comprising a rim engaging portion having at least one lip for engaging the wheel rim;

a tire engaging portion having a tire engaging end and a handle engaging end, the tire engaging portion being slidably connected relative to the rim engaging portion via a pin sliding in a slot, the tire engaging end further having a tire-engaging surface;

wherein when the rim engaging portion is engaged with the wheel rim and the tire engaging surface is engaged with a surface of the tire, the tire engaging member is movable along the rim engaging member via the pin and slot to impart a removal force to the tire in a direction substantially parallel to the wheel axis to axially disengage a bead of the tire from the wheel rim.

9. The tool of claim 8, wherein the connection between the pin and slot enables the rim and tire engaging portions to translate and rotate with respect to each other to impart a removal force to the tire, wherein a component of the removal force is applied in a direction perpendicular to the wheel axis.

10. The tool of claim 8, wherein the rim engaging portion further comprises a rim-body contact part disposed opposite to the lip, the lip further having a hooked shape for engaging a flange of the wheel rim, and the rim-body contact part further having a roller for bracing against a body portion of the wheel rim, wherein the roller has an axis oriented substantially perpendicular to the wheel axis.

11. The tool of claim 8, wherein the tire engaging end has a roller disposed at a distal end thereof for reducing friction between the tire and the tire engaging end during use.

12. The tool of claim 8, wherein a distal portion of the tire engaging surface is angled away from the rim engaging portion.

13. The tool of claim 8, wherein the tire engaging portion further comprises a tire bead support member disposed adjacent the handle engaging end, the support member being placed and configured to engage a first bead of the tire to provide support to the tire when the tool is used to engage a second bead of the tire.

14. The tool of claim 13, wherein the tire bead support member is one of selectively movable along the tire engaging member and provided with plural engagement positions to receive and engage beads of a plurality of different tire sizes.

15. A method for removing a tire from a wheel rim having a wheel axis, comprising:

providing a rim engaging member having a recess with first and second opposing lips configured to engage a rim of the wheel, the rim engaging member having a clamping position in which the first lip engages a flange of the wheel rim and the second lip engages a wall portion of the wheel rim to clamp the rim engaging member to the rim;

providing a tire engaging member having a tire engaging surface for imparting a removal force to a tire using a handle, the tire engaging member connected to the rim engaging member via a pin moveable in a slot for sliding movement thereon;

pressing the tire engaging surface between the rim and the tire in a direction substantially parallel to the wheel axis until the rim engaging member is in the clamping position; and moving the tire engaging member on the rim engaging member in a first direction by rotating the handle toward the wheel axis, the movement imparting a removal force to the tire in a direction substantially parallel to the wheel axis to lift a tire bead over the flange of the wheel rim.

16. The method of claim 15, wherein the slot and pin connection allows the tire engaging member and rim engaging member to translate and rotate with respect to each other.

17. The method of claim 15, wherein the rim engaging member has a rim-flange engaging lip and an oppositely disposed rim-body contact part, the rim-flange engaging lip being hooked to engage a flange of the wheel rim, and the rim-body contact part having a roller for bracing against a body portion of the wheel rim, the roller having an axis oriented substantially perpendicular to the wheel axis.

18. The method of claim 15, wherein the tire engaging member has a roller at a distal end of the tire engaging surface for reducing friction between the tire and the tire engaging member during use, the roller having an axis oriented substantially perpendicular to the wheel axis.

19. The method of claim 15, wherein the moving step further comprises imparting a removal force to the tire, the removal force having a first force component substantially parallel to the wheel axis and a second force component substantially perpendicular to the wheel axis.

20. The method of claim 15, further comprising the steps of:

moving the tire engaging member in the first direction by an amount sufficient to lift the tire bead over the wheel flange;

moving the tire engaging member on the rim engaging member in a second direction that is opposite the first direction by an amount sufficient to engage the tire bead with a tire bead support member disposed on a handle engaging portion of the tire engaging member;

moving the tire engaging member on the rim engaging member in the second direction until the tire engaging surface is engaged with a second tire bead, wherein the engagement between the tire bead support member and the first tire bead supports the tire so that the tire engaging surface can be engaged with the second tire bead; and moving the tire engaging member on the rim engaging member in the first direction by rotating the handle toward the wheel axis, the movement imparting a removal force to the tire in a direction substantially parallel to the wheel axis to lift the second tire bead over the flange of the wheel rim.

21. A tool for removing a tire from a wheel rim, comprising a rim engaging portion having at least one lip for engaging the wheel rim;

a tire engaging portion having a tire engaging end and a handle engaging end, the tire engaging portion being slidably connected relative to the rim engaging portion via a pin and slot connection, the tire engaging end further having a tire-engaging surface and a tire bead support member disposed adjacent the handle engaging end, the tire bead support member being positioned and configured to engage a first bead of the tire to provide support to the tire when the tool is used to engage a second bead of the tire;

wherein when the rim engaging portion is engaged with the wheel rim and the tire engaging surface is engaged with a surface of the tire, the tire engaging member is movable along the rim engaging member via the pin and slot connection to impart a removal force to the tire in a direction substantially parallel to the wheel axis to axially disengage a bead of the tire from the wheel rim.

22. A tool for removing a tire from a wheel rim, comprising a rim engaging portion having at least one lip for engaging the wheel rim;

a tire engaging portion having a tire engaging end and a handle engaging end, the tire engaging portion being slidably connected to the rim engaging portion, the tire engaging end further having a tire-engaging surface and a roller disposed at a distal end thereof for reducing friction between the tire and the tire engaging end during use;

wherein when the rim engaging portion is engaged with the wheel rim and the tire engaging surface is engaged with a surface of the tire, the tire engaging member is movable along the rim engaging member to impart a removal force to the tire in a direction substantially parallel to the wheel axis to axially disengage a bead of the tire from the wheel rim.

* * * * *